W. N. JOHNSON.
SYSTEM OF CAR SIGNALING FOR GRADE CROSSINGS.
APPLICATION FILED JULY 29, 1913.
1,113,013.
Patented Oct. 6, 1914.
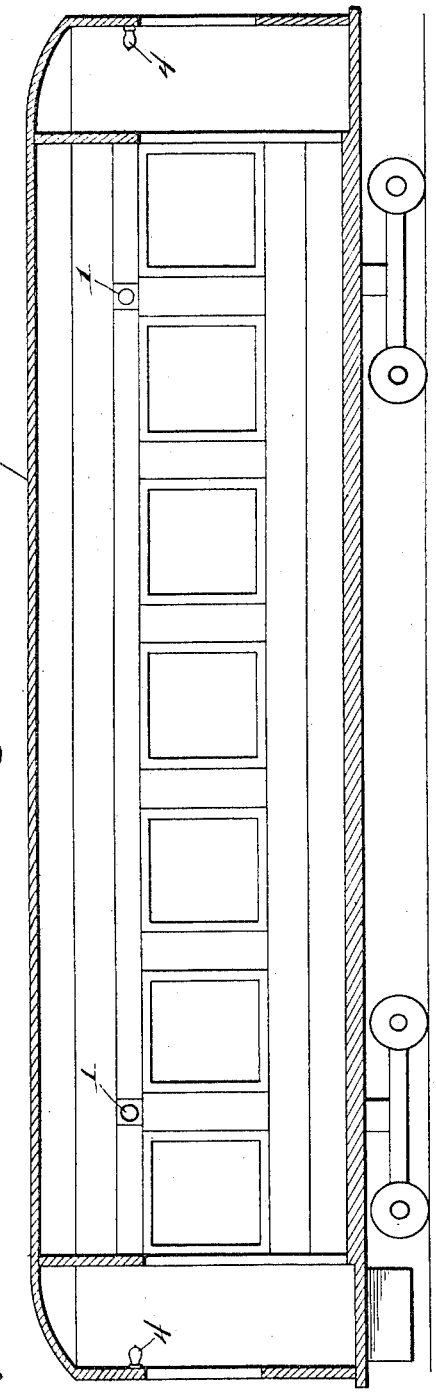
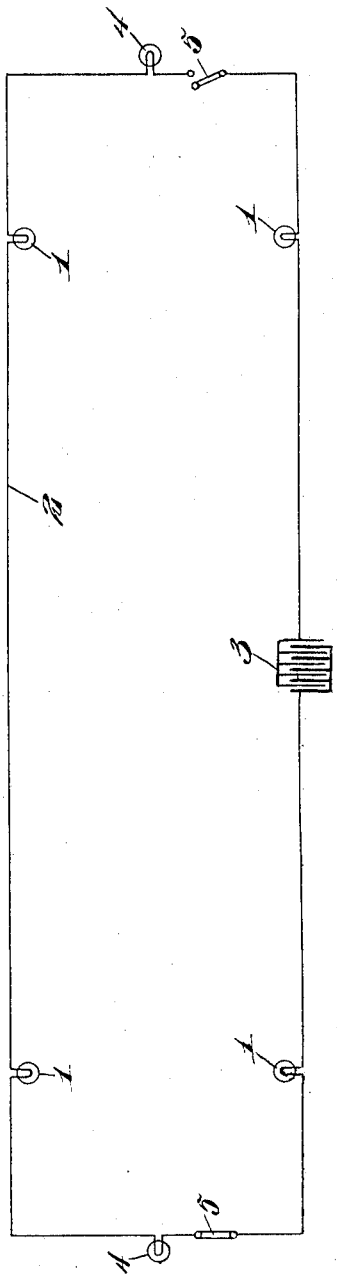
Witnesses
Louis R. Heinrich
John J. McCarthy
Inventor
Walter N. Johnson
By Victor J. Evans
Attorney

UNITED STATES PATENT OFFICE.

WALTER N. JOHNSON, OF WILLIAMSPORT, PENNSYLVANIA, ASSIGNOR OF ONE-HALF TO LEWIS C. SMITH AND HERMAN W. SMITH, OF WILLIAMSPORT, PENNSYLVANIA.

SYSTEM OF CAR-SIGNALING FOR GRADE-CROSSINGS.

1,113,013. Specification of Letters Patent. Patented Oct. 6, 1914.

Application filed July 29, 1913. Serial No. 781,811.

*To all whom it may concern:*

Be it known that I, WALTER N. JOHNSON, a citizen of the United States, residing at Williamsport, in the county of Lycoming and State of Pennsylvania, have invented new and useful Improvements in Systems of Car-Signaling for Grade-Crossings, of which the following is a specification.

This invention relates to improvements in car signaling systems and has particular application to a crossing signal system for electrically propelled cars.

In carrying out the present invention, it is my purpose to provide a system of car signaling for use at grade crossings and embodying electric lamps at opposite sides of the car and disposed adjacent to each end thereof and connected in series in an electric circuit, and means for closing the circuit to illuminate the lamps when the car is passing over the crossing so that the motorman or operator of a train approaching the crossing on the other line of track will be advised as to the condition of the crossing.

It is also my purpose to provide a system of car signaling of the class described which will embrace the desired features of simplicity, efficiency, durability and reliability and which may be installed and maintained at a minimum expense.

With the above and other objects in view, the invention consists in the construction, combination and arrangement of parts hereinafter set forth in and falling within the scope of the claim.

In the accompanying drawing; Figure 1 is a longitudinal sectional view through a car equipped with the present invention. Fig. 2 is a diagrammatic view of the invention.

Referring now to the accompanying drawing in detail, A designates a car of any suitable or preferred construction. Upon opposite sides of the car adjacent to each end thereof and disposed immediately below the roof of the car are electric lamps 1, 1 disposed in suitable chambers or compartments formed in the sides of the car and visible through colored bull's eyes. An electric circuit 2 includes the lamps 1, 1 in series and is supplied with current from a suitable source of electrical energy such, for instance, as a storage battery 3. Located in each vestibule of the car is a pilot lamp 4 also connected in series in the circuit 2, while switches 5, 5 are arranged at each end of the car and connected in series in the circuit 2 so that the circuit may be closed from either end of the car. The pilot lamps are disposed within the vision of the motorman, while the switches are within convenient reach of the conductor.

From the foregoing description taken in connection with the accompanying drawing, the construction and manner of employing my invention will be readily apparent. It will be seen that when a car is passing over a crossing and the electric power is cut off, the lamps in the car will be extinguished, while by means of my improved system of car signaling, the lamps 1, 1 may be illuminated independently of the supply of power to the car lamps, thereby advising the motorman of the train or car operating over the other line of track of the condition of the track. It will be observed that by displaying the side lights of the car or train, while such car or train is passing over the crossing, safety will be assured.

I claim:

In a system of car signaling for grade crossings, the combination with a car having chambers formed in the sides adjacent to the opposite ends thereof, of electric lamps disposed within said chambers, a local circuit including said lamps in series, switches for closing said circuit when the car passes over a crossing whereby the side lights will be visible to the motorman of a car approaching the crossing on another track, and pilot lamps connected in series in said circuit and disposed within the vestibule of the car whereby the motorman thereof will be advised as to the condition of the signaling system.

In testimony whereof I affix my signature in presence of two witnesses.

WALTER N. JOHNSON.

Witnesses:
W. G. HINEBAUCH,
GEORGE TRUEMPE.